Figure 1:
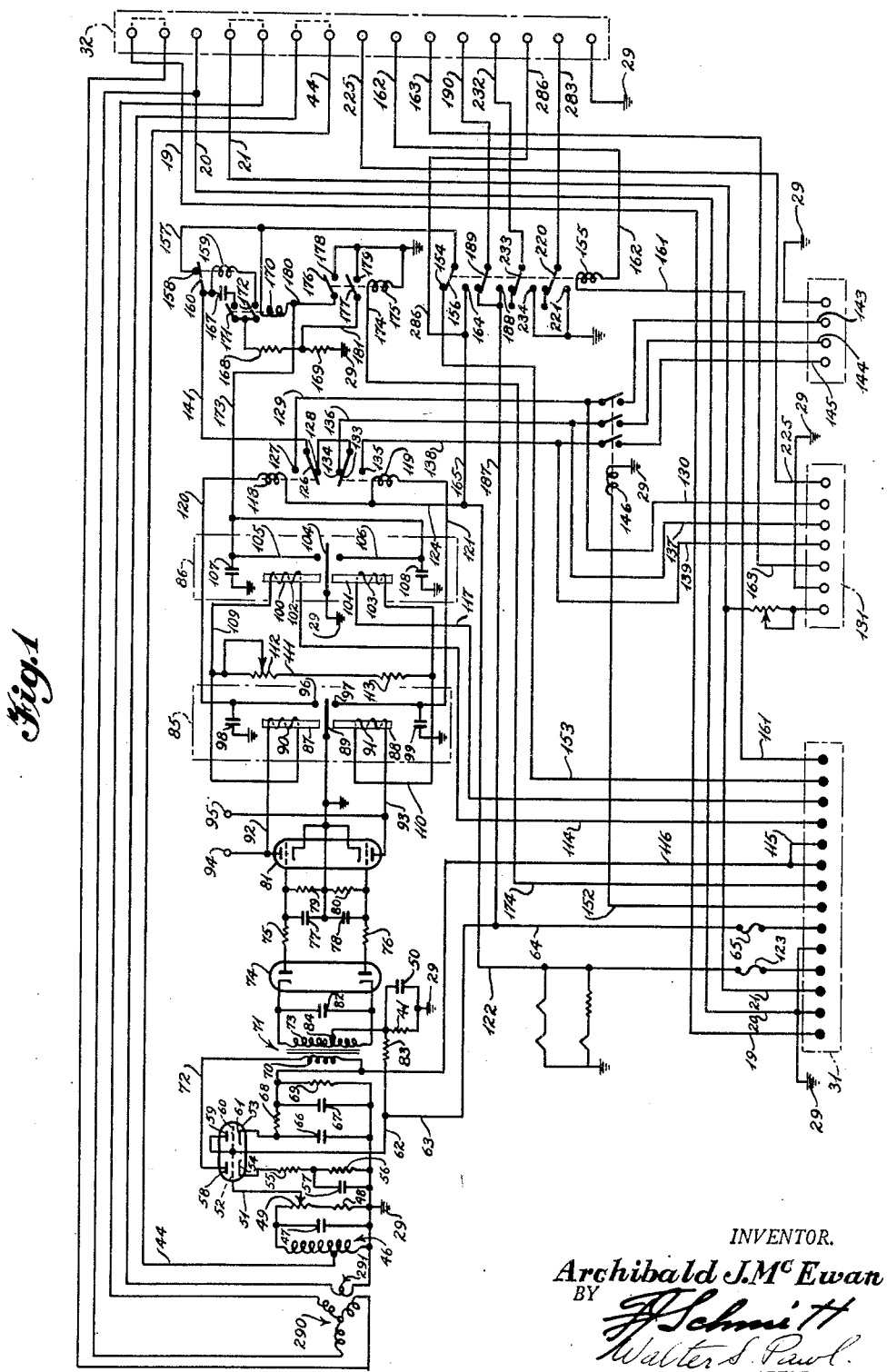

May 31, 1955 A. J. McEWAN 2,709,797
GYRO CONTROLLED ATTITUDE INDICATING AND TRACKING APPARATUS
Filed March 18, 1952 4 Sheets-Sheet 1

INVENTOR.
Archibald J. McEwan
BY
*F. Schmitt*
*Walter S. Pauli*
ATTORNEYS

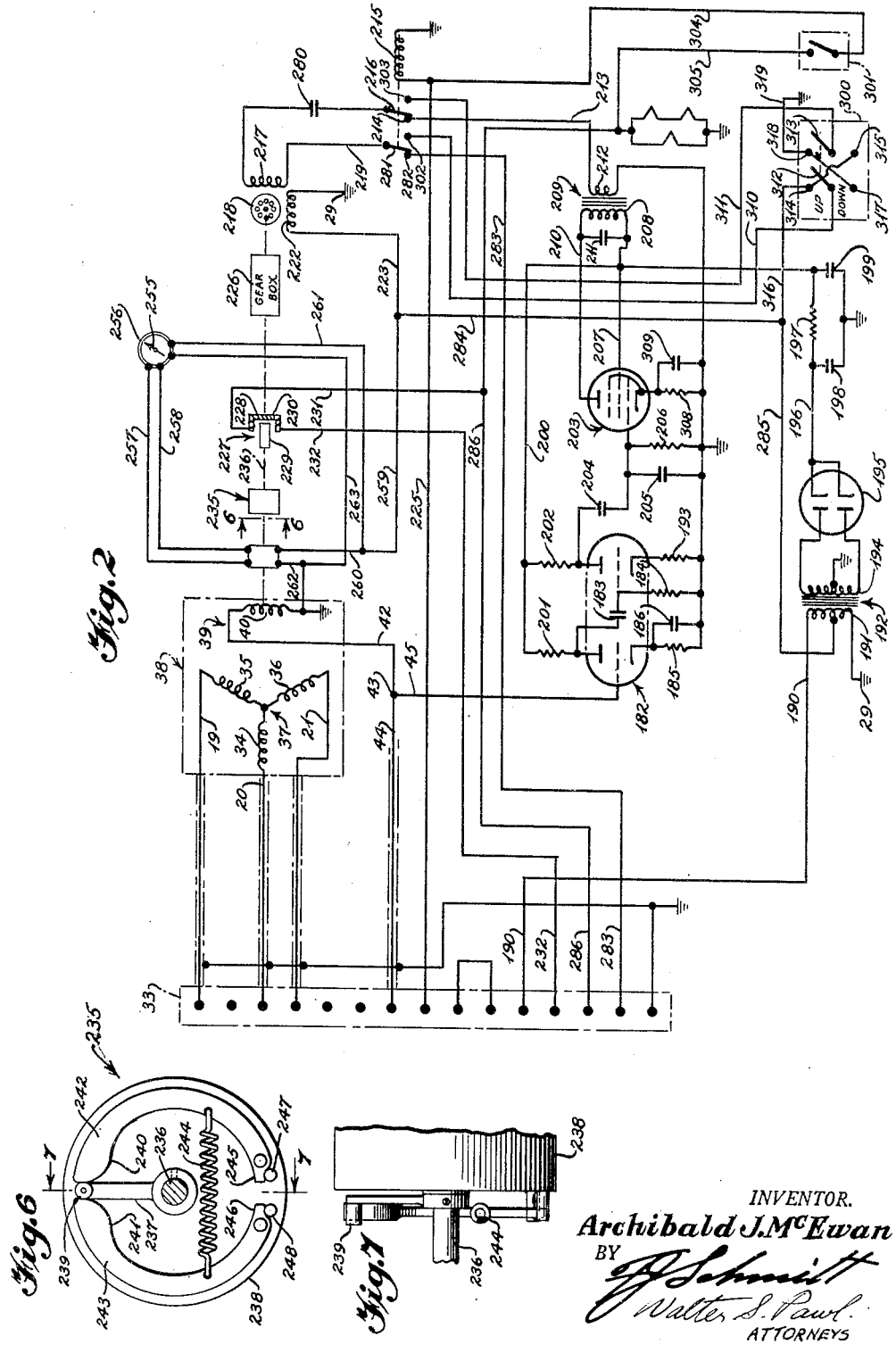

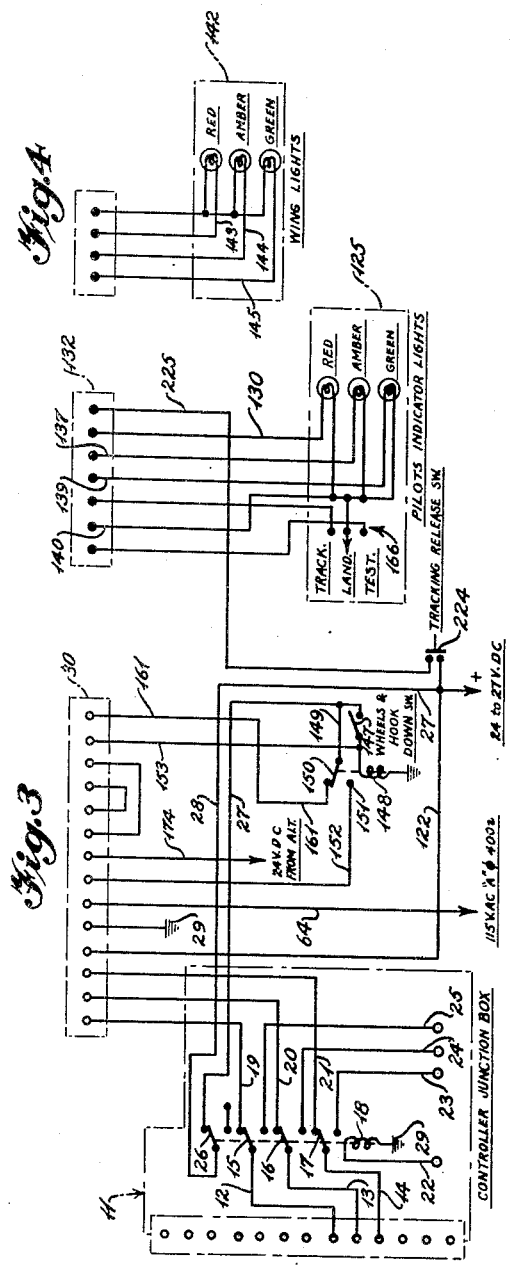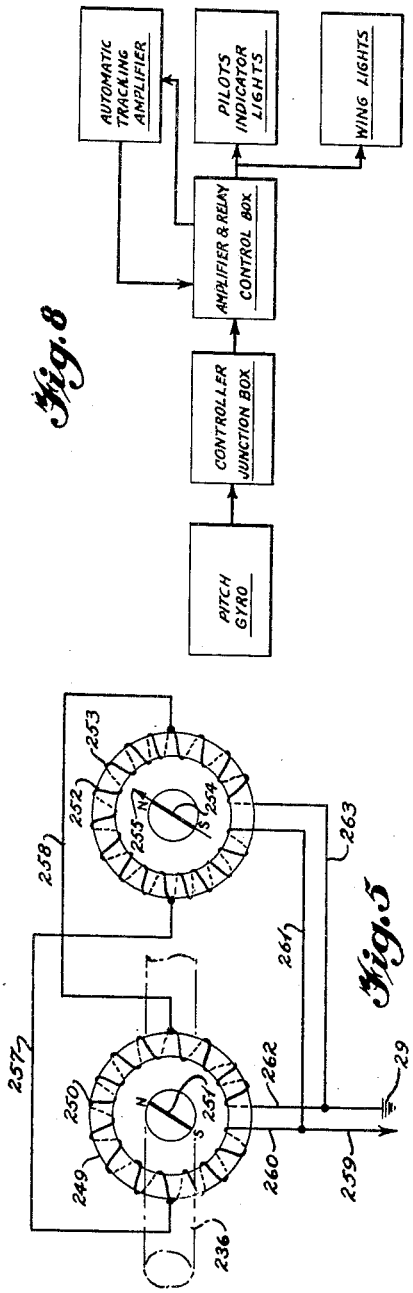

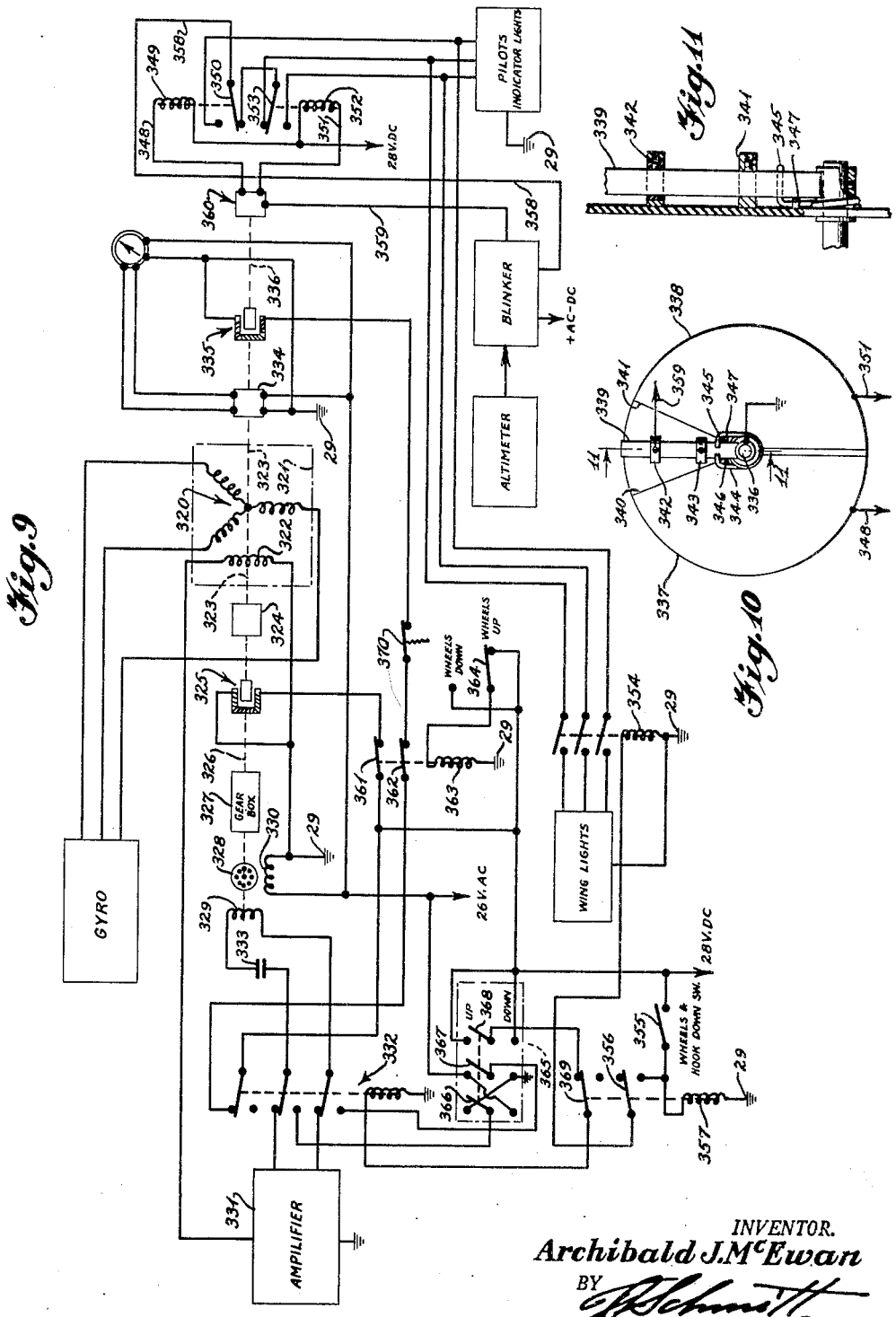

United States Patent Office 2,709,797
Patented May 31, 1955

2,709,797

GYRO CONTROLLED ATTITUDE INDICATING AND TRACKING APPARATUS

Archibald John McEwan, Washington, D. C.

Application March 18, 1952, Serial No. 277,314

25 Claims. (Cl. 340—27)

(Granted under Title 35, U. S. Code (1952), sec. 266)

The present invention relates to an aircraft gyro-controlled attitude indicator and more particularly to an attitude indicator having an automatic tracking adapter.

In flying military aircraft the pilot has great need for an instrument which will indicate the attitude of the aircraft. For example, in toss bombing techniques the pilot has to fly certain optimum dive angles and maintain this dive angle in order to hit the target. Once on the dive angle it is a must to maintain the aircraft as close to this angle as possible. Therefore an instrument which can lock itself on the given dive angle and supply the pilot with information with regard to deviations thereabout is of much use. Another situation requiring accurate attitude information is in taking off from an aircraft carrier at night. When the aircraft is catapulted from the forward end of the carrier the pilot must immediately know his attitude in order to prevent diving into the water in a nose-down condition or stalling in a nose-up condition. Another use of attitude information is in landing aboard a carrier at night. In this situation both the pilot in the aircraft and the landing signal officer on the carrier must know the approach attitude of the aircraft. In order to correct for deviations about this approach attitude, an instrument which will indicate this to the pilot and landing signal officer is a necessity. When the aircraft is flying a particular attitude and the pilot is receiving information with regard to deviations about this attitude, he may wish to change attitudes and receive information denoting deviations about this new attitude. For example, the aircraft may be approaching a target in level flight and then wish to go into a certain optimum dive angle to hit the target. Apparatus which will automatically permit this is of great assistance to the pilot. Other uses of attitude information include level bombing, toss bombing and many instrument flight techniques.

It will be seen that any instrument which is to provide this information under all the conditions required must have some way of adapting itself to each condition as required.

An object of the present invention is to provide a gyro-controlled attitude indicating instrument which can accurately follow the attitude of the aircraft from one position to another and supply the pilot with an indication thereof.

Another object of the invention is to furnish an attitude indicating instrument which continuously follows the attitude of the aircraft, said instrument being adapted to be zero-set so that any attitude within the gyro limits may be made the reference attitude.

Still another object of this invention is to provide an instrument as above described which supplies signal indications to the pilot when the aircraft deviates above or below the reference attitude so that corrective steps may be undertaken.

A further object of the present invention is to provide in the instrument described above means for presetting an attitude indicating instrument at an attitude other than that which the aircraft is flying in combination with light indicating means which supply the pilot of the aircraft with information as to what corrective steps must be taken to bring the aircraft to the preset attitude, said indicating means having light means which notify the pilot when he reaches the preset attitude.

A still further object of this invention is to provide in the apparatus described above means for presetting the rotor at a reference attitude so that when the aircraft is placed in a landing configuration, the rotor is automatically returned to said reference attitude.

The above and other objects and advantages of the invention will be more readily apparent from the following description when read in connection with the accompanying drawing, in which:

Fig. 1 is a schematic diagram of the amplifier;
Fig. 2 is a schematic diagram of the tracking unit;
Fig. 3 is a schematic diagram of the controller junction box and the pilot's indicator light box;
Fig. 4 is a schematic diagram of the wing lights;
Fig. 5 is a schematic diagram of the attitude meter;
Fig. 6 is a view in elevation of the automatic referencing device for the tracking unit;
Fig. 7 is a view taken on line 7—7 of Fig. 6;
Fig. 8 is a block diagram of the present invention;
Fig. 9 is a schematic diagram of a modified form of the invention;
Fig. 10 is a front elevation of the light indicator switch for the modified form of the invention shown in Fig. 9; and
Fig. 11 is a view taken on line 11—11 of Fig. 10.

Similar reference characters represent similar parts throughout the several views. Ease in understanding the grouping of the several views may be obtained by arranging Fig. 2 to the right hand side of Fig. 1, and Figs. 3 and 4 beneath Fig. 1.

The pitch gyroscope is shown in block form in Fig. 8. The conventional aircraft gyroscope includes an autosyn generator consisting of a rotor having one winding and a stator having three windings spaced 120° apart. The relative position of the rotor and stator windings changes as the aircraft deviates about the horizontal plane of the gyroscope and the rotor induces sine waves in the three stator windings. The amplitude of the sine wave in each of the stator windings is dependent upon the angular relation of the rotor winding to the particular stator winding involved. The three-wire pitch information is fed through conductors 12, 13 and 14 in controller junction box 11, Fig. 3 to armatures 15, 16 and 17 of the four pole double throw relay 18. When relay 18 is in its non-energized position, as shown, the information is fed to conductors 19, 20 and 21. Conductors 22, 23, 24 and 25 lead to the automatic pilot, not shown. When the automatic pilot is turned on, power is supplied through relay 18 to ground 29 from conductor 22, thus energizing the relay and supplying the pitch information to the automatic pilot. Armature 26 of the relay is provided to supply power from conductor 28, which is connected to the 24–28 v. D. C. power supply, to conductor 27. When relay 18 is energized this circuit is broken.

With the automatic pilot off and relay 18 as shown, the three-wire pitch information goes through conductors 19, 20 and 21, to the multiple socket 30. Multiple plug 31, when connected to socket 30 receives the signal and transmits it through the same conductors 19, 20 and 21 in Fig. 1 to multiple socket 32. Multiple plug 33 of Fig. 2 is inserted in socket 32 and the pitch information is supplied to windings 34, 35 and 36 of stator 37 of autosyn motor 38. The rotor of autosyn motor 38 is indicated by the reference numeral 39 and its winding is indicated by numeral 40, the latter being grounded at 29. Conductors 19, 20 and 21 are shielded from plug 33 to the stator windings.

The output of rotor 39 consists of a voltage induced therein by the signals supplied to the stator windings and is fed through conductor 42 to a terminal 43. It will be seen that the amplitude of the signal induced in the rotor winding will be dependent upon the angular relationship between the axis of the rotor winding and the resultant flux in the stator windings, the amplitude being a maximum when the resultant flux is parallel to the rotor winding and a minimum when the resultant flux is perpendicular thereto. From this terminal the voltage goes to conductors 44 and 45. Conductor 44 feeds to autotransformer 46, Fig. 1, through plug 33 and socket 32. The autotransformer is shunted by a condenser 47 and by resistance 48 and potentiometer 49 in series. This condenser is utilized to improve the resonant characteristics of the autotransformer. One side of the autotransformer 46, condenser 47, and resistance 48 are grounded as at 29. The output from potentiometer 49 is fed through conductor 51 to grid 52 of twin-triode 53. Cathode 54 grounds through series resistances 55 and 56, the latter resistance being shunted by condenser 57. In this manner partial degeneration is furnished to improve the signal characteristics. Thus, half of the twin-triode, including cathode 54, grid 52 and plate 58, amplifies the signal input. A D. C. potential for plate 58 is supplied by the second half of the tube, including plate 59, grid 60 and cathode 61, in a manner now to be described. A single phase 115 v. A. C. voltage of 400 cycles/sec. is supplied to plate 59 and grid 60 through conductors 62, 63, and 64 from the power supply indicated in Fig. 3. A 2 amp. fuse 65 is inserted in line 64. This voltage is rectified and passed from cathode 61 through a filter network consisting of condensers 66, 67 and resistance 68. Resistance 69 is a bleeder resistor. Condenser 66 connects the input side of resistance 68 to ground 29 while the other side of the resistance is connected to ground through condenser 67 and resistance 69 which are connected in parallel. The filtered voltage is applied to one end terminal of primary 70 of transformer 71. From the other end terminal of the primary a positive D. C. voltage is applied to plate 58. Thus, the signal is amplified by one triode of tube 53 and supplied to primary 70 of transformer 71.

A signal rectification and phase discrimination circuit is provided comprising the secondary 73 of transformer 71, a twin-diode rectifier tube 74, a filter smoothing network, and a reference injection voltage circuit. Secondary 73 is shunted by condenser 82 to improve the resonant characteristics of the transformer. The filter smoothing network consists of resistances 75 and 76, connecting the anodes of tubes 74 and the grids of a twin-triode amplifier tube 81, condensers 77 and 78, connecting resistances 75 and 76 to ground 29, respectively, and resistances 79 and 80, connected in parallel with condensers 77 and 78, respectively. The reference voltage injection circuit consists of resistance 83, connecting the 115 v. A. C. 400 cycles/sec. input to center tap 84 of secondary 73, and resistance 41 and condenser 50, connected in parallel with each other and connecting center tap 84 to ground 29.

The signal voltage in push-pull and the reference voltage of the proper phase in push-push are applied to the two cathodes of tube 74. Phase discrimination and rectification takes place, and the output, filtered by the smoothing network, is applied to the grids of tube 81. In order to insure that the input signal and the reference voltage are either in phase, or 180° out of phase, the reference voltage is phase corrected by resistances 83 and 41, and condenser 50. The magnitude of the reference voltage is such that it is at least equal to that of the signal voltage at the cathodes of tube 74 when the gyroscope is in its maximum deviation position. The cathodes of tube 81 are grounded as at 29.

The plate circuit of tube 81 comprises two polarized differential relays 85 and 86, indicated in dotted lines on Fig. 1. Terminals 94 and 95 are provided in the plate circuit of tube 81 for plugging in a graphical recorder, if desired. This instrument could be used to plot angular deviations about a reference attitude. Relay 85 includes a pair of iron cores 87 and 88 mounted on each side of a pivoted armature 89, the latter being grounded at 29. Coils 90 and 91 are wound on cores 87 and 88, respectively, one end of coils 90 and 91 being connected by conductors 92 and 93, respectively, to the plates of tube 81. Contacts 96 and 97 are adapted to be engaged by armature 89 when the latter is actuated. Contacts 96 and 97 are connected to ground through condensers 98 and 99, respectively. Relay 86 is of the same construction as relay 85 and includes iron cores 100 and 101 having coils 102 and 103, respectively. An armature 104 is mounted between the electromagnets and is grounded as at 29. Contacts 105 and 106 are connected to ground 29 through condensers 107 and 108, respectively.

One end of coils 102 and 103 is connected to the output end of coils 90 and 91 respectively, through conductors 109 and 110, respectively. Conductors 109 and 110 are connected together by a controllable shunt including potentiometer 112, resistance 113 and conductor 111. By the use of this shunt, relay 86 will always close at a slightly higher plate current differential in tube 81 than relay 85. Direct current energy for coils 102, 103, 90 and 91, and the two plates of tube 81, is obtained from the rectifier portion of tube 53. Coil 102, which is connected to coil 90 and one plate of tube 81, has one end thereof connected to conductor 114 which leads to multiple plug 31. This conductor is shorted in socket 30 to conductor 115, shown in Fig. 1, which is in turn connected to conductor 116. This latter conductor is connected to the filtered output from the rectified output of tube 53. Coil 103, which is connected to coil 91 and the other plate of tube 81, has one end thereof connected to conductor 117 which leads to multiple plug 31, the latter conductor being shorted in socket 30 to conductor 116.

The D. C. voltage which is applied to the grids of amplifier tube 81 has a magnitude proportional to the amplitude of the rotor output signal and a polarity which is a function of the phase of said signal. Thus, the differential current flowing in the plates of tube 81 will be dependent on the same variables. When the differential current reaches a predetermined value, relay 85 is actuated. The controllable shunt operates to require a higher plate-current differential for the actuation of relay 86 than that required to actuate relay 85. The increase in current differential required to close relay 86 depends upon the value of resistance 113 and the position of potentiometer 112.

Relay 85 controls a pair of single pole double throw relays 118 and 119, said relays being connected, respectively, to contacts 96 and 97 by conductors 120 and 121, respectively. A 24–28 v. direct current is supplied through conductor 122, socket 30, plug 31, fuse 123, and conductor 124 to relays 118 and 119. Thus when either of contacts 96 or 97 is grounded by armature 89 the relay which is associated with the contact is energized.

The control-indicator box, illustrated by the numeral 125 and shown in Fig. 3, is mounted in the aircraft cockpit. This box includes red, amber and green lights. An amber light indicates to the pilot that he is flying in the attitude chosen as a reference attitude. A red or green light indicates respectively, that the aircraft is in a nose-down or nose-up condition in relation to the reference attitude. These lights are energized by relays 118 and 119 in a manner now to be described.

An armature 126 is associated with relay 118 and contacts 127 and 128. Conductors 129 and 130 along with socket 131 and plug 132 serve to connect contact 127 with the red light in the control-indicator box. Contact 128 is connected to an armature 133 associated with relay 119 and contacts 134 and 135. Conductors 136, 137 and 138, 139 serve to connect the amber and green lights, respectively, to contacts 134 and 135, respectively. A common conductor 140 connects all three of the lights to ground 29 which is connected to socket 131. Thus, when both relays 118 and 119 are in their unenergized positions as shown in Fig. 1, the common power supply conductor for the lights, illustrated by the numeral 141, is connected to the amber light. Relays 118 and 119 are in this unenergized position when there is no differential current flowing and the aircraft is flying its reference attitude. When the aircraft moves to a nose-down condition, a differential current flows, the polarity of cores 87 and 88 being such that armature 89 engages contact 96 which energizes relay 118. Thus, the power supply line 141 grounds through the red light. In a nose-up condition the polarity of cores 87 and 88 is reversed and relay 119 is energized. This time power supply line 141 connects to the green light. When the pilot sees either the red or green light he can begin taking corrective steps in controlling the flight of the aircraft until the amber light is energized.

Wing lights 142 are also furnished for the aircraft and are shown in Fig. 4. The red, amber and green lights connect to conductors 129, 136 and 138, respectively, through conductors 143, 144 and 145, respectively, such connection being made through a three pole single throw relay 146. These lights are connected to a common ground. Since the only time the pilot desires the wing lights to function is during the landing operation, a microswitch 147 is associated with the wheels and tail hook so that whenever they are in their "down" position the switch closes. Thus, the microswitch closes the circuit from the 24-28 v. D. C. power supply, obtained from terminal 26 of relay 18 through conductor 28, to a grounded single pole double throw relay 148 which is associated with the microswitch. A conductor 149 is also connected to microswitch 147 and supplies power to relay 146 through armature 150 and contact 151, said armature and contact being associated with relay 148, and conductor 152.

Therefore, when the wheels and hook are down the microswitch energizes relay 148 which energizes relay 146, the latter in turn connecting the wing lights into the system.

While the green and red lights warn the pilot that he is above or below the reference attitude, he has no way of knowing the degree of deviation. In order that a warning might be provided, a blinker circuit is utilized in connection with the control-indicator lights and the wing lights. The circuit is energized by differential relay 86, which, as stated above, is energized by an increase in differential current flow beyond that required to energize relay 85.

This blinker circuit is connected into the power supply to all the lights and therefore by mere actuation of a relay the lights may be cut on or off. This power supply comes from the 24-28 v. D. C. shown in Fig. 1 and may be supplied in one of two ways depending on certain conditions in the aircraft. When the aircraft is in a landing configuration the microswitch 147 connects the 24-28 v. D. C. supply to contact 154 of a four pole double throw relay 155. An armature 156, associated with said contact and relay, transmits the power to conductor 157 which leads to contact 158 of relay 159, said relay having an armature 160 which connects to conductor 141. It will be noted that any time the plane is in landing configuration relay 155 receives no power through conductor 161, since relay 148, which is also energized, breaks the circuit. The wing lights can receive energy under these conditions since relay 148 energizes the wing light relay 146.

When the aircraft is not in the landing configuration no power is received in conductor 153 since the microswitch has broken the circuit. However, since relay 148 is deenergized, power flows through conductor 161 and relay 155, the latter relay being connected through conductor 162, socket 32, plug 33, conductor 163, socket 131 and plug 132 to the "track" terminal of the function selector switch 166. The "track" terminal is grounded by conductor 140, thus completing the circuit. It should be stated at this point that when the indicator arm points to "land" the lights are energized as mentioned above. The other time when the lights are needed is when the tracking apparatus of Fig. 2 is utilized.

The energizing of relay 155 connects armature 156 to contact 164 which is connected to the 24-28 v. D. C. power supply through conductors 165 and 122. Thus power is still supplied to the lighting circuit under either landing or non-landing configuration. However, in the non-landing configuration the wing lights are turned off by relay 146 since these are only for the landing signal officer on the aircraft carrier.

The blinker circuit, previously mentioned, comprises condenser 167, the coil of relay 159 and resistances 168 and 169, condenser 167 and the relay coil being connected to armature 160. The double pole single throw relay 170, having armatures 171 and 172, connects the condenser and relay coil in parallel with each other and in series with resistances 168 and 169, the latter resistance being grounded as at 29. It will be noted that relay 170 is connected by conductor 173 to the output of relay 86 and is grounded through the blinker circuit aforementioned. Thus, when relay 86 is closed due to an increase in deviation beyond that required to operate relay 85, relay 170 is energized, completing the blinker circuit. Since condenser 167 is intermittently charged and discharged the relay coil is periodically energized, making and breaking the engagement of armature 160 and contact 158. This causes the lights to occult, warning the pilot that his deviation from the reference attitude has reached a predetermined amount.

Another safety feature incorporated in the invention is a low altitude warning circuit. If the aircraft drops below a minimum predetermined safe altitude, a 28 v. D. C. signal is applied to conductor 174 which energizes a double pole single throw relay 175 having armatures 176 and 177, and grounded contacts 178 and 179. Armature 176 is connected by conductor 180 to the coil of relay while armature 177 is connected by conductor 181 to a point between resistances 168 and 169. When the altimeter signal closes relay 175, relay 170 is also energized, simultaneously, and resistance 169 is shorted to ground, which results in the blinker circuit being operated at a much faster rate.

In the event the tracking autosyn shown in Fig. 2 is inoperative, the lights may still be operated by sending the three-wire pitch information in lines 19, 20 and 21, through the dotted lines in socket 32 to autosyn stator 290 having rotor 291 associated therewith. The rotor output is fed to conductor 44 which leads to autotransformer 46. By making rotor 291 manually adjustable, the aircraft may be used for obtaining deviations about a reference attitude at which the rotor may be set.

Many times when the pilot is returning to the aircraft carrier he may forget to lower the wheels and tail hook. In the event this occurs, it will immediately be noted by the landing signal officer when the function selector switch is placed in the "land" position. The only means for obtaining energy for the wing lights is through relay 148, energized by microswitch 147. Thus, if the wheels are still up, the microswitch is open and relay 148 cannot be energized to close relay 146, and therefore no energy flows to the wing lights. This is an added safety feature furnished by the novel circuitry of the instant invention.

In general, the automatic tracking attachment shown in Fig. 2 is adapted to receive an output from rotor 39 of autosyn 38 and supply this signal to one phase of a two phase motor for driving the rotor until the signal output of the rotor is zero. Therefore, as the plane is maneuvered through various attitudes the two phase motor drives the rotor until there is zero output.

More particularly, the output from rotor 39 is supplied through conductors 42 and 45 to the grid of the first section of a twin-triode amplifier tube 182. The amplifier output of the first section is supplied through condenser 183 to the second section of the tube where the signal is again amplified. Resistance 184 connects the second stage grid to ground 29. The cathode of said first section is connected to ground through resistance 185 arranged in parallel with condenser 186. The second section cathode is connected to ground through resistance 193.

Plate supply for tube 182 is obtained from a rectified A. C. voltage. Conductors 64 and 187 supply 115 v. A. C. to contact 188 in relay 155. Armature 189 connects the supply to conductor 190 which connects to the primary winding 191 of transformer 192, one end terminal of said primary being grounded. The transformer secondary winding 194 is center tapped and grounded and the end terminals applied to the plates of a twin-diode rectifier tube 195. The output from this tube enters a filter network through conductor 196, said filter network comprising resistance 197 and condensers 198 and 199. The voltage from the filter network is applied through conductor 200 and resistances 201 and 202, to the plates of both sections of tube 182.

Tube 182 makes up two stages of a three stage amplifier for the rotor output signal. The third stage thereof is made up of pentode 203. Signal voltage from the second stage is applied to the control grid of tube 203 through a coupling network including condensers 204 and 205, and resistance 206. A. D. C. voltage from rectifier 195 is applied from conductor 200 through conductor 207 to the screen grid of tube 203. The suppressor grid thereof is shorted to the cathode, the latter being grounded through resistance 308 and condenser 309, said resistance and condenser being connected in parallel.

Plate voltage is supplied from rectifier 195 through primary winding 208 of transformer 209 and conductor 210, said primary winding being shunted by condenser 211. The plate output signal voltage is coupled by transformer 209, through primary winding 208 and secondary winding 212 and conductor 213, to contact 214 of double pole double throw relay 215. An armature 216, associated with said relay and contact, connects the plate output through phasing condenser 280 to winding 217 of a two-phase motor 218, said winding being connected to ground through conductor 219, armature 281 and contact 282 of relay 215, conductor 283, and armature 220 and contact 221 of relay 155. Condenser 280 is inserted to give a 90° phase displacement in the excitation of the two windings of motor 218. Winding 222 of said two-phase motor is supplied with a reference A. C. voltage through conductors 223, 284 and 285, the latter of which taps primary 191 of transformer 192. This tapped supply is 26 v. 400 cycles/sec. A. C.

It will be noted that relay 215 is normally unenergized which permits connection of the amplified signal voltage to one winding of the motor. One control for this relay is tracking release switch 224, said switch connecting the 24–28 v. D. C. power supply to the relay through conductor 225. When the tracking release switch is closed relay 215 is energized and tracking automatically ceases since one phase of the motor is now deenergized. This switch is intended to be utilized in situations calling for short time intervals. Another control for relay 215 will be treated as the description proceeds, since its use depends on structure not yet described.

The two-phase motor is mechanically connected by shaft 236 through gear box 226 and magnetic clutch 227 to rotor 39 of autosyn 38. Thus, any time there is a signal output from the pitch gyroscope and therefore an output from rotor 39 to the three-stage amplifier, motor 218 is energized and drives rotor 39 in a direction to decrease the amplitude of the rotor signal output until there is a zero output from the rotor. This means that whenever the pilot deviates from the reference plane at which the gyroscope is set, rotor 39 is rotated until the field of its coil is perpendicular to the resultant field of stator 37.

Magnetic clutch 227 is shown diagrammatically as including a driving member 228 and a driven member 229, both connected to the shaft connecting rotor 39 and motor 218. These members may be of soft iron material. Member 228 has a coil 230 wound thereon, one end of said coil being connected by conductors 231 and 286 to conductor 165 which has a 24–28 v. D. C. power supply connected thereto. The other end of winding 230 is connected by conductor 232 to armature 233 and contact 234 of relay 155, said contact being grounded as at 29. Thus the only time the clutch is energized is when relay 155 is closed. Since this relay is closed during the tracking operation continuous contact between the driving and driven members is maintained during tracking.

Since the motor and rotor are disconnected whenever the tracking operation ceases, due to relay 155 breaking the clutch circuit, means is provided to automatically return the rotor to the reference attitude. This reference attitude may have any preset value within the pitch limitations of the gyroscope. However, it is preferred to use the optimum landing attitude for the aircraft as the reference attitude. This means, illustrated by the numeral 235, is shown more particularly in Figs. 6 and 7. Shaft 236 is shown to extend through a stationary bearing member 238 and has an arm 237 fixedly connected therewith. The arm connection, however, is angularly adjustable so that the preset reference attitude may be changed. A roller 239 is rotatably mounted at the outer end of the arm and is adapted to engage cam surfaces 240 and 241 on cams 242 and 243, respectively. These cams are semi-circular in configuration with one end thereof pivoted at the lower end of bearing member 238. A coil spring 244 connects the mid-portions of the cams. The ends of cams 240 and 241 adjacent the pivot are provided with lugs 245 and 246, respectively, which are adapted to contact stationary pins 247 and 248, respectively. These pins prevent rotation of cam 242 and 243 in a counterclockwise and clockwise direction, respectively, from the positions shown in Fig. 6.

The operation of this zeroing device is simple. As shaft 236 rotates, arm 237 also rotates, cam follower 239 riding on either cam surface 240 or 241, depending on the direction of rotation. When the magnetic clutch is deenergized spring 244 urges arm 237 back to the position shown in Fig. 6. Thus, rotor 39 of autosyn 38 is returned to its reference position. The signal lights may still be operated since any deviation of the aircraft about this reference plane furnishes a signal output to the rotor which supplies the signal to the amplifier and relay control. One use for this device is in landing the aircraft aboard the carrier. When the tail hook and wheels are lowered microswitch 147 is closed, thereby deenergizing the magnetic clutch. Since the rotor reference attitude is that which is optimum for landing, the pilot is automatically supplied with deviations about this landing attitude.

In order that the pilot may have a continuous indication of the attitude of his aircraft during the tracking operation, an indicator is provided as seen in Figs. 2 and 5. An iron annular core 249, having a coil 250 wound thereon is mounted to surround a permanent magnet 251 which is fixed to shaft 236. A similar apparatus including core 252, winding 253 and permanent magnet 254 is provided on the instrument panel in full view of the pilot. An indicator needle 255 is secured to magnet 254 for indicating degrees on a dial 256, as seen in Figs. 2 and 5, and conductors 257 and 258 connect coils 250 and 253, respectively, at two separate points, said points being 120° apart on each coil. Alternating current energy is supplied from conductor 259 to coils 250 and 253 through conductors 260 and 261, respectively, and grounded through conductors 262 and 263, respectively. Since the permanent magnet 251 is fixed to the shaft and core 249 is stationary, movement of the shaft moves the magnet relative to the core. Magnet 254 rotates freely to align itself with magnet 251. Thus, the two permanent magnets are always in parallelism. Needle 255 indicates the angle of deviation of the aircraft about a horizontal plane.

Many times the pilot may want to put the aircraft in a particular attitude for toss bombing purposes or any other time when he is flying at one attitude and desires to be in another. Under the present invention this may be accomplished by driving motor 218 until needle 255 indicates the desired angle, and locking the motor at this angle. When the aircraft approaches the desired attitude the red or green light ceases blinking, becomes solid color, and then at the attitude desired, the amber light is energized. The above is accomplished through a double pole double throw reversing switch 300 which is normally biased in a neutral position and a single pole single throw switch 301, normally open. The latter switch is utilized to energize relay 215 so that armatures 281 and 216 are positioned to engage contacts 302 and 303, respectively. Conductor 304 connects switch 301 to the relay and conductor 305 connects said switch to conductor 286, the latter being connected to receive a direct-current power supply.

Conductors 310 and 311 serve to connect armatures 312 and 313, respectively, to both terminals of winding 217 through relay 215. A 26 v. A. C. power supply from primary 191 of relay 192 is connected to contacts 314 and 315 of switch 300 through conductors 285 and 316. Contacts 317 and 318 of the same switch are grounded through conductor 319. It will be apparent that by moving armatures 312 and 313 to their "up" position the motor is driven in one direction, and when the armatures are in their "down" position the motor direction is reversed. Since switch 300 is spring loaded to a normal neutral position the pilot can push the switch armatures in either direction and hold in that position until the motor rotates the shaft to a position where needle 255 indicates the attitude desired. This, of course drives rotor 39 similarly. The output from this winding is fed to the signal lights through the amplifiers and relays shown in Fig. 1. Since relay 215 is energized it no longer connects the output of rotor 39 to motor 218 and the motor is therefore stopped in the position at which switch 300 was opened.

The operation of this invention will now be explained in detail. Three-wire pitch information comes from the gyroscope stator and is supplied to the autosyn stator wherein a resultant flux is established. The rotor has a sine wave output signal which is supplied to the amplifier and relay circuit, Fig. 1, where amplification, phase discrimination and rectification take place. The rectified signal is applied to the two grids of tube 81. The differential current flowing in the plates of this tube is dependent on the phase and magnitude of the signal voltage from the rotor. This differential voltage is applied to differential relay 85 which energizes either a red or a green light in the cockpit, depending upon the direction of deviation from the reference plane. If the plane is in the landing configuration, i. e., with the tail hook and wheels down, the wing lights will also be energized. Because differential relay 86 has a controllable shunt in its circuit connection to the signal output, a slightly higher differential current is required for actuation. Therefore, when the deviation goes beyond predetermined limits the light which has already been energized to denote a deviation begins to blink or occult. As a safety measure, a signal is supplied when the aircraft goes below a pre-determined altitude, this signal being supplied to the occulting circuit in such a manner as to increase the occulting rate. It will be noted that any energized light occults at a rapid rate when the altitude becomes dangerous.

The signal voltage from rotor 38 is also supplied to the two-phase motor which drives the rotor. The signal is first amplified and then fed to one phase of the motor. A phasing condenser 280 assures proper phase displacement for operation of the motor. When the gyroscope signal is one caused by a nose-up condition, for example, the output from the rotor to the motor is such that the motor is driven in a direction to place the rotor winding perpendicular to the resultant flux in the stator. When this condition occurs there is zero output and therefore the motor stops. If the deviation is caused by a nose-down condition the sine wave output of the gyroscope is displaced 180° from the signal caused by a nose-up condition. This signal, when induced in the rotor is amplified and fed to one phase of the motor. Since this signal is displaced 180° from the signal caused by a nose-up condition, the motor is driven in the opposite direction until the rotor has zero output.

To relate the above to actual flight conditions let us assume that the plane is on the carrier. The apparatus is turned on and selector switch 166 is positioned on "track." Therefore the pilot gets a continuous amber light. When the aircraft is catapulted the pilot can maintain a constant check of his attitude by watching the indicator needle.

Many times a catapult may fail to fire with full force or the aircraft may lose its engine immediately after being catapulted. Under these conditions the aircraft most likely falls into the water ahead of the carrier. It is imperative to the pilot's safety to hit in a nose-up condition. Therefore the pilot may wish to use switches 300 and 301 to preset the rotor so that an amber light is energized at some selected nose-up condition. This attitude is usually one above which the pilot does not wish to go because of the possibility of stalling the aircraft. Therefore the pilot is assured that if he stays on the amber light he will not stall out, or in the event he hits the water, his attitude will give maximum chances for recovery.

As the aircraft is maneuvered away from the carrier the tracking unit automatically drives the rotor to a condition of zero output so that the rotor follows closely the attitude changes of the aircraft.

If the pilot puts the aircraft in a particular attitude and maintains this attitude, rotor 39 has no output. To obtain signal lights to indicate deviations about this particular attitude, the pilot merely closes switch 301. This switch energizes relay 215 and prevents signal current from being supplied to motor 218 and the rotor is locked in this particular attitude. Thus when the plane deviates from this attitude, a signal output is induced in the rotor and the differential relays energize the lights in the manner described. Should the pilot decide to change his reference attitude, it is but necessary to put the aircraft in the new attitude, open switch 301 and the motor automatically drives the rotor so that it has zero output at the new attitude. By again closing switch 301 deviation signals are furnished. Examples of a need for the above operation arise in bombing approaches where the pilot maneuvers the plane into a dive attitude on a collision course with the target. The pilot has a choice of using switch 301 or the tracking release switch for setting the rotor to a position where it has zero output on the collision course. Therefore, the pilot can fly the remainder of the distance to the target by light signals. If the pilot should see that he is slightly off the target, he releases the tracking release switch or opens switch 301 for an instant and a new reference attitude is established.

Should the pilot be flying in, for example, a horizontal plane and decide that he would like to put the aircraft into a 30° dive from the horizontal plane he follows the procedure described below. Switch 301 is closed and armatures 312 and 313 of switch 300 are moved into engagement with contacts 314 and 318. These connections permit motor 218 to be driven in a direction so that needle 255 indicates a 30° dive angle. At this time the green light in the cockpit is occulting. Then the pilot leaves the horizontal plane and approaches the 30° dive angle. First the green light ceases occulting and becomes a solid color. This warns the pilot he is approaching the new reference attitude. When the amber light is energized, the plane is in the 30° dive.

In the landing operation the pilot maneuvers the aircraft into an approach path in relation to the aircraft carrier. When the tail hook and wheels are lowered, microswitch 147 automatically closes energizing relay 148 which in turn supplies power to relay 146. This relay places the wing lights 142 in circuit with the amplifier and relay control box, Fig. 1. Simultaneously the magnetic clutch 227 between motor 218 and rotor 39 is deenergized. The automatic referencing device, Figs. 6 and 7, returns the rotor to its preset reference attitude which is the correct landing attitude. Therefore, when an amber light is obtained, the aircraft is in the correct approach attitude. The landing signal officer is apprised of the time when the aircraft is in the proper attitude by the wing lights.

Should the pilot come in for landing without the wheels and tail hook being in their landing positions, the landing signal officer cannot see the wing lights since microswitch 147 is open. Thus, the pilot may be notified of the fact or waved off for another approach.

From the above detailed description of the apparatus and its operation, it will be seen that the pilot of the aircraft can more efficiently and effectively perform his duties. Sufficient safeguards are incorporated to make the apparatus reliable under all conditions.

Figs. 1 through 8, described in detail above, represent a preferred embodiment of the present invention.

The modified form of the present invention shown in Figs. 9, 10 and 11 utilizes a mechanical switching device in place of the electronic switch and relay in the preferred embodiment. As shown in Fig. 9, the gyroscope supplies three-wire pitch information to stator 320 of autosyn 321. A rotor 322 is associated with the stator windings in the usual way. This rotor is mounted on a shaft 323 which extends in opposite directions therefrom. An automatic referencing device 324, identical with the device indicated by numeral 235 shown in Figs. 6 and 7, is mounted on shaft 323 and is utilized for the same purpose. Magnetic clutch 325 serves to connect shaft 323 with an aligned shaft 326, the latter shaft being connected through gear box 327 to the shaft of motor 328. This motor is identical to motor 218 and utilizes windings 329 and 330, the latter winding being supplied with a reference A. C. voltage from a suitable power supply.

As shown one end of the rotor winding is grounded while the other end supplies an A. C. signal to amplifier 331, from which the signal is supplied through three-pole double throw relay 332 to winding 329. Phasing condenser 333 is identical to condenser 280 of Fig. 2 and is for the same purpose. Amplifier 331 may be in the form of that shown in Fig. 2 including tubes 182, 203 and transformer 209.

With the arrangement thus far described, it will be seen that the apparatus will automatically track the aircraft attitude. This attitude will be indicated by meter 334 which is mounted on the other end of shaft 323. This meter is identical with the meter shown in Fig. 5.

A second magnetic clutch 335 is mounted on shaft 323 and couples to shaft 336. A light-controlling switch 360 is mounted on shaft 336, said switch being shown in detail in Figs. 10 and 11. This switch is arranged so that movement of shaft 336 in either direction causes light signal indications. The switch includes a pair of conducting plates 337 and 338 mounted about the shaft in a fixed position and permitting the shaft to rotate therein. An arm 339 is fixedly mounted on the shaft and is adapted to be normally positioned centrally of a segment formed by surfaces 340 and 341 on plates 337 and 338, respectively. A pair of contacts 342 and 343 are adjustably mounted along the length of arm 339 by set screws or other conventional means. The ends of torsional spring arms 344 and 345 are adapted to engage arm 339 to bias said arm in a neutral position centrally of the aforementioned segment. Torsional spring arms 344 and 345 are limited in their clockwise and counterclockwise movement, respectively, by stops 346 and 347, respectively. The opposite ends of the torsional springs may be secured in convenient manner to plates 337 and 338, but insulated therefrom.

Conducting plate 337 is connected by conductor 348 to one end of relay coil 349, said relay coil controlling a double throw armature 350, the other end of the coil being connected to a 28 v. D. C. power supply. Conducting plate 338 is connected by conductor 351 to one end of relay coil 352, said relay controlling double throw armature 353. The other end of coil 352 is connected to 28 v. D. C. power supply. Armatures 350 and 353 are adapted to control the pilot indicator lights and the wing lights in the same manner as relays 118 and 119, Fig. 1. The wing lights are placed in the circuit by relay 354 which is controlled by the wheels and hook down microswitch 355 through armature 356 of double pole double throw relay 357. Relays 357 and 354 have 28 v. D. C. power supply connected thereto through microswitch 355.

The operation of switch 360 will now be explained in detail. With shaft 336 coupled to shaft 323, movement of the rotor by motor 328 causes movement of arm 339. It will be noted that arm 339 is grounded. Therefore as soon as contact 343 touches conducting plate 338, for example, the conducting plate is grounded therefore completing the circuit for relay 352 and energizing a red or green light. The power supply to the lights is supplied through the blinker circuit and conductor 358. As arm 339 moves further in a clockwise direction, contact 342, which is insulated from arm 339, engages plate 338, thereby grounding the blinker circuit through conductor 359. The blinker controls the power supply to the lighting circuits to thereby cause the lights to occult in a manner identical to that shown in Fig. 1. The altimeter also feeds into the blinker circuit to cause a faster occulting light as in the embodiment of Fig. 1.

The power supply to clutches 325 and 335 is controlled simultaneously by armatures 361 and 362, respectively, of relay 363, said relay being energized by the wheels up and wheels down switch 364. That is, whenever the wheels are either all the way up or all the way down relay 363 is energized from a 28 v. D. C. power supply. As the wheels move from one position to the other, however, the two clutches are deenergized.

In the embodiment shown in Fig. 2, switches 300 and 301 were used to drive motor 218 to thereby set a predetermined attitude for the autosyn rotor. In the embodiment shown in Fig. 9, a three pole triple throw switch 365 is utilized for a similar purpose. Whenever armatures 366, 367 and 368 are placed in their "up" position, armature 368 connects a 28 v. D. C. power supply to energize relay 332, thus removing the signal output from the amplifier to motor 328. However, relay 332 connects winding 329 to armatures 366 and 367, which armatures connect the winding to ground and 26 v. A. C., respectively. Therefore, motor 328 is driven in one direction to position the rotor and the indicator needle at a particular attitude. When switch 365 is returned to its neutral position, relay 332 is deenergized and the rotor signal output is again supplied to the motor. Therefore when the aircraft is maneuvered into the set attitude, an amber light is obtained.

A special feature of this embodiment is the use of armature 369 of relay 357 to disconnect all power supply to relay 332 when the wheels and hook down microswitch is closed. Therefore, when the aircraft is placed in the landing configuration there is no chance of accidentally driving the motor through switch 365 and thus loosing the automatically set landing reference attitude.

There are times when magnetic clutch 335 needs to be denergized without affecting clutch 325. To accomplish this, a switch 370 is utilized which is normally biased to a closed position.

The operation of the modification will now be described. Automatic tracking of the aircraft attitude is obtained in the same manner as in the preferred embodiment. To obtain light indications about a particular attitude in which the aircraft is situated, the pilot opens switch 370 a time interval sufficient to permit the arm 339 of switch 360 to return to a neutral position, as seen in Fig. 10. (This is indicated by an amber lamp being energized.) Then switch 370 is released and any rotation of the rotor shaft moves arm 339 into contact with plates 337 or 338. As explained above, if the grounded contact 343 engages plate 338, this plate is grounded also. Thus relay 352 is energized to provide a green or red light. If the aircraft deviates further from the preset attitude contact 342 touches grounded plate 338 thus grounding the blinker circuit. This causes the light already energized to occult.

The operation of switch 365 has already been explained in detail and it is considered that further explanation is unnecessary.

When the pilot operates the wheel lowering mechanism (not shown) switch 364 is moved from the "wheels up" position to the "wheels down" position. During the short time interval necessary for the wheels to attain their landing configuration magnetic clutches 325 and 335 are de-energized. At this time the automatic referencing device 324 returns rotor 322 to its predetermined landing position. Also springs 344 and 345 return arm 339 to its neutral position. Thus, when the wheels are completely down, both clutches are energized so as to lock shafts 326, 323 and 336 together. When an amber light is obtained, the pilot knows that he is in his correct landing approach attitude.

Thus, this modified form of the invention continuously indicates attitude within the pitch limitations of the gyroscope while simultaneously indicating, by a system of lights, deviations about any desired or preselected attitude. In addition, the width of the amber light in degrees of attitude may be varied simply by moving contact 343 on arm 339. Furthermore, by moving contact 342 along arm 339 the width of the solid red and solid green light regions can be varied.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

I claim:

1. Attitude indicating and tracking apparatus comprising autosyn means including a stator inductively related to a rotor, gyroscope means mounted on a movable body for supplying an A.-C. attitude signal to said rotor through said stator, relay means, said relay means being energized by said rotor output signal, indicating means connected to said relay means and to be energized thereby, and motive means connected to said rotor to rotate said rotor when said motive means is energized, said motive means being connected to receive said rotor signal output and to be energized thereby.

2. Attitude indicating and tracking apparatus adapted to be mounted on an aircraft having a gyroscope thereon which supplies signals representative of the attitude of the aircraft, said apparatus comprising autosyn means including a stator and a rotor, said rotor being mounted on a shaft, motive means connected to said shaft for rotating said rotor when said motive means is energized, said stator being connected to said gyroscope for receiving the attitude signals and setting up a resultant flux field, said rotor having a proportionate signal induced therein with an amplitude which is a function of the angular relationship between the rotor and the resultant flux field of said stator, means connecting said motive means to receive the output signal of said rotor for driving said rotor in a direction to decrease the amplitude of the output signal thereof, indicating means mounted on said shaft means for supplying information as to the angular position of said rotor, said indicating means being calibrated in degrees to represent attitudes within the gyroscope limits, the aircraft being in the attitude indicated on said indicating means when there is zero output from said rotor.

3. Apparatus as described in claim 2 wherein a plurality of lights are provided to receive the output signal from said rotor, one of said lights being energized when the aircraft is above the attitude indicated by said indicating means, another of said lights being energized when the aircraft is on the attitude indicated, and another of said lights being energized when the aircraft is below the attitude indicated.

4. Apparatus as described in claim 3, relay means mounted in the circuit connecting the rotor signal output to the motive means, means for opening said relay to thereby prevent the rotor signal output from controlling said motive means, manually controlled means for energizing said motive means and driving said indicating means to indicate an attitude other than that of said aircraft, said lights being thereby energized to indicate the aircraft attitude in relation to the attitude indicated by said indicating means.

5. Attitude indicating and tracking apparatus comprising autosyn means including a stator and a rotor, said stator and rotor being inductively related so that a signal applied to said stator is induced in said rotor, attitude indicating means, switch means connected to said attitude indicating means for controlling the energizing of said attitude indicating means, said switch means being connected to said rotor to be operated thereby, motive means connected to said rotor for rotating said rotor when said motive means is energized, and means connecting the output signal of said rotor to said motive means so that said motive means is energized thereby.

6. Attitude indicating and tracking apparatus adapted to be mounted on an aircraft having a gyroscope mounted thereon for supplying an amplitude proportional to the amount of angular deviation in attitude from a predetermined attitude, said apparatus comprising autosyn means including a stator inductively related to a rotor, said stator being connected to receive said A.-C. signal from said gyroscope and to induce a proportional signal in said rotor, the amplitude of the signal induced in said rotor being dependent upon the relationship of the resultant flux field in said stator and the axis of said rotor, switch means connected to said rotor to be controlled thereby, a plurality of indicating lights connected to and energized by said switch means, said lights providing information indicative of the relationship between the aircraft and the gyroscope reference plane and between the resultant flux of the stator and the rotor axis, motive means connected to said rotor for rotating said rotor when said motive means is energized, the resultant flux field relationship of said stator and rotor axis being changed by rotation of said rotor thus varying the amplitude of the signal induced in said rotor, and means connecting said motive means to receive the signal output of said rotor and to be energized thereby.

7. Attitude indicating and tracking apparatus adapted to be mounted on an aircraft having a gyroscope mounted thereon for supplying an A.-C signal having an amplitude proportional to the amount of angular deviation in attitude from a predetermined attitude, said apparatus comprising an autosyn including a stator having a plurality of windings and a rotor having at least one winding, said stator and rotor windings being inductively related, said rotor winding having a predetermined reference position in relation to said stator windings, said stator windings being adapted to be connected to receive said gyroscope signal and induce said signal in said rotor, the output signal from said rotor having an amplitude dependent upon the relationship between the flux field in said stator and the angular position of said rotor winding with respect thereto, motive means connected to said rotor for rotating said rotor when said motive means is energized, means connecting said motive means to the signal output of said rotor winding so that said motive means is energized thereby, switch means connected to said rotor to be energized thereby, a plurality of indicating lights, the switch means being connected to control the energizing of said lights, means for selecting a predetermined reference attitude about which deviation information is desired, one of said lights being energized when the aircraft is in said predetermined attitude, and the other lights being energized selectively when the aircraft is in a nose-up or nose-down attitude with respect to said predetermined attitude.

8. Attitude indicating and tracking apparatus adapted to be mounted on an aircraft having a gyroscope mounted thereon for supplying an A.-C. signal having an amplitude proportional to the mount of angular deviation in attitude from a predetermined attitude, said apparatus comprising autosyn means including a stator inductively related to a rotor, said stator being connected to receive said A.-C. signal from said gyroscope and to induce a proportional signal in said rotor, the amplitude of the signal induced in said rotor being dependent upon the relationship of the resultant flux field in said stator and the axis of said rotor, motive means connected to said rotor for rotating said rotor when said motive means is energized, the resultant flux field relationship of said stator and rotor axis being changed by rotation of said rotor thus varying the amplitude of the signal induced in said rotor, means connecting said motive means to receive the signal output of said rotor and to be energized thereby, a plurality of indicating lights, switch means mounted on a shaft for rotation therewith, said switch means being connected to said lights for controlling the energizing thereof, means coupling said shaft to said rotor to be driven therewith, said switch means having a neutral position at which one of said lights is energized and positions one either side of said neutral position for energizing the other indicating lights, said switch means being placed in its positions by rotation of said shaft.

9. Attitude indicating and tracking apparatus adapted to be mounted on an aircraft having a gyroscope mounted thereon for supplying an A.-C. signal having an amplitude proportional to the amount of angular deviation in attitude from a predetermined attitude, said apparatus comprising autosyn means including a stator inductively related to a rotor, said stator being connected to receive said A.-C. signal from said gyroscope and to induce a proportional signal in said rotor, the amplitude of the signal induced in said rotor being dependent upon the relationship of the resultant flux field in said stator and the axis of said rotor, motive means connected to said rotor for rotating said rotor when said motive means is energized, the resultant flux field relationship of said stator and rotor axis being changed by rotation of said rotor thus varying the amplitude of the signal induced in said rotor, means connecting said motive means to receive the signal output of said rotor and to be energized thereby, said motive means being driven to rotate said rotor in a direction to decrease the amplitude of the A.-C. signal output thereof, a plurality of indicating lights, switch means mounted on a shaft for rotation therewith, said switch means being connected to said lights for controlling the energizing thereof, clutch means coupling said shaft to said rotor for rotation therewith, said switch means having a biased neutral position at which one of said lights is energized, a second position which energizes another of said lights when said shaft is rotated in a clockwise direction, a third position at which still another of said lights is energized when said shaft is rotated in a counterclockwise direction, and means for disengaging said clutch means thus disengaging said shaft from driving relation with said rotor at which time said switch means returns to said biased neutral position.

10. An aircraft attitude indicating system for indicating aircraft pitch deviations about any selectable aircraft pitch attitude comprising a pitch gyroscope mounted on said aircraft, an autosyn generator operatively coupled to said pitch gyroscope for producing an output which is dependent upon the deviation of said aircraft from any given reference attitude at which said pitch gyroscope is set, an autosyn motor coupled to said autosyn generator, said autosyn motor being capable of being shifted in position an amount which is equivalent to the output received from said autosyn generator, locking means operatively associated with said autosyn motor for locking said autosyn motor at any position thereof, signalling means coupled to said autosyn motor, said signalling means including first means for producing a first response when said autosyn motor is in a position which corresponds to that of said autosyn generator to thereby indicate that the position of said autosyn motor corresponds to the actual attitude of the aircraft, said signalling means also including second and third means for producing second and third responses when said autosyn motor is locked in a position which corresponds to an attitude which is either above or below the actual pitch attitude of the aircraft, said position in which said autosyn motor is locked corresponding to the selectable aircraft pitch attitude about which pitch deviations are desired to be indicated.

11. An aircraft attitude indicating system as set forth in claim 10 wherein said autosyn motor consists of a stator and a rotor, and said locking means are operatively connected to said rotor for locking said rotor in any position thereof.

12. An aircraft attitude indicating system as set forth in claim 10 wherein said signalling means includes a plurality of differently colored lights, and said first means is a light of one color and said second and third means are lights having colors which are mutually different from the color of the lights of said first means.

13. An aircraft attitude indicating system for indicating aircraft pitch deviations about any selectable pitch attitude of an aircraft comprising a pitch gyroscope mounted on said aircraft, an autosyn generator operatively coupled to said pitch gyroscope for producing an output which is dependent upon the deviation of said aircraft from any given reference attitude at which said pitch gyroscope is set, an autosyn motor coupled to said autosyn generator, said autosyn motor being capable of changing position, in response to said autosyn generator output, an amount which is equivalent to the change in output of said autosyn generator, said last mentioned change being caused by changes in attitude of said aircraft, locking means operatively connected to said autosyn motor for locking said autosyn motor in any position thereof, and signalling means coupled to said autosyn motor for producing one type of signal when said autosyn motor is in a position which corresponds to the position of said autosyn generator which in turn corresponds to the actual attitude of the aircraft and for producing other types of responses when said autosyn motor is locked in a position which does not correspond to the actual position of said autosyn generator which in turn corresponds to the actual attitude of the aircraft, said position in which said autosyn motor is locked being the selectable pitch attitude of the aircraft about which aircraft pitch attitude deviations are indicated by said signalling means.

14. An aircraft attitude indicating system as set forth in claim 13 wherein said signalling means comprises relay means which are normally inoperative when said autosyn motor is in a position which corresponds to the actual attitude of the aircraft and which are energized to complete an electrical circuit which produces predetermined signals when the actual position of said autosyn motor does not correspond to the actual pitch attitude of said aircraft.

15. An aircraft attitude indicating system for indicating aircraft pitch deviations about any selectable pitch attitude of the aircraft comprising a pitch gyroscope mounted on said aircraft, an autosyn generator operatively coupled to said pitch gyroscope for producing an output which is dependent upon the deviation of said aircraft from any given reference attitude at which said pitch gyroscope is set, an autosyn motor coupled to said autosyn generator for receiving the output thereof, a tracking motor, means coupling said autosyn motor to said tracking motor to cause said tracking motor in response to the output received by said autosyn motor from said autosyn generator to shift the position of said autosyn motor to a position corresponding to the position of said autosyn generator, signalling means coupled to said autosyn motor, said signalling means including means for producing one type of signal when the position of said autosyn motor corresponds to the position of said autosyn generator which in turn corresponds to the actual pitch attitude of the aircraft, means for stopping the tracking motor and therefore stopping autosyn motor at any position thereof, and other means included in said signalling means for producing other types of signals when the pitch attitude of said aircraft deviates above or below the attitude of the aircraft at which said autosyn motor was stopped, whereby the attitude of the aircraft at which the autosyn motor was stopped becomes the selectable attitude about which aircraft pitch deviations are indicated.

16. An aircraft attitude indicating system as set forth in claim 15 including indicating means coupled to said autosyn motor for indicating, in units of angular measurement, the aircraft attitude which corresponds to the position of the autosyn motor.

17. An aircraft attitude indicating system as set forth in claim 15 including a clutch for connecting said tracking motor to said autosyn motor, means connected to said clutch for selectively engaging and disengaging said clutch whereby said tracking motor is selectively connected to and disconnected from said autosyn motor, and means connected to said autosyn motor for positioning said autosyn motor in a preset position when said clutch is disengaged whereby said attitude indicating system will indicate deviations about an aircraft attitude which corresponds to said preset position of said autosyn motor.

18. An aircraft attitude indicating system for indicating aircraft pitch deviations about any desired pitch attitude of the aircraft comprising a pitch gyroscope mounted on said aircraft, an autosyn generator operatively coupled to said pitch gyroscope for producing an output which is dependent upon the deviation of said aircraft from any given reference attitude at which said pitch gyroscope is set, an autosyn motor coupled to said autosyn generator for receiving the output thereof, signalling means coupled to said autosyn motor, said signalling means including first means for producing a first signal when said autosyn motor position corresponds to the position of said autosyn generator and therefore to the actual pitch attitude of the aircraft and second and third means for producing second and third signals, respectively, when said autosyn motor position corresponds to a position which is either below or above the actual attitude of the aircraft, motive means coupled to said autosyn motor for changing the position of said autosyn motor, and means coupled to said motive means for energizing said motive means to cause said motive means to change the position of said autosyn motor means, the position to which the autosyn motor is moved corresponding to the desired attitude about which aircraft pitch deviations are to be indicated.

19. An aircraft attitude indicating system as set forth in claim 18 including indicating means coupled to said autosyn motor for indicating, in units of angular measurement, the aircraft attitude which corresponds to the position of said autosyn motor.

20. An aircraft attitude indicating system for indicating aircraft pitch deviations about any aircraft pitch attitude comprising a pitch gyroscope mounted on said aircraft, an autosyn generator operatively coupled to said pitch gyroscope for producing an output which is dependent upon the deviation of said aircraft from any given reference attitude at which said pitch gyroscope is set, an autosyn motor coupled to said autosyn generator, said autosyn motor producing a signal voltage when said autosyn motor is in a position which does not correspond to the position of said autosyn generator, a first electrical circuit coupled to said autosyn motor, a motor, said first electrical circuit coupling said signal voltage to said motor, a mechanical linkage connecting said motor to said autosyn motor, said motor producing a mechanical output having a direction which is dependent on the phase of said autosyn motor signal voltage whereby said autosyn motor is normally returned by said motor to a position which corresponds to the position of said autosyn generator, a switch in said first circuit for breaking said first electrical circuit between said autosyn motor and said motor whereby said motor is caused to stop in the position in which said first circuit was broken and caused to hold said autosyn motor in said position because of the mechanical linkage therebetween, a second electrical circuit coupled to the output of said autosyn motor, first indicating means in said second circuit for giving an indication when the position of said autosyn motor corresponds to the position of said autosyn generator the position of which in turn corresponds to the actual pitch attitude of the aircraft, and second and third indicating means in said second circuit for giving indications when the actual attitude of the aircraft is either above or below the attitude which corresponds to the position of the autosyn motor, respectively, the position in which said autosyn motor is stopped corresponding to the aircraft pitch attitude about which deviations are indicated.

21. An attitude indicating system as set forth in claim 20 including a clutch mounted in said mechanical linkage which connects said motor to said autosyn motor, means connected to said clutch for selectively engaging and disengaging said clutch whereby said motor is selectively connected to and disconnected from said autosyn motor, and means connected to said autosyn motor for positioning said autosyn motor in a preset position when said clutch is disengaged whereby said indicating system will indicate deviations about an aircraft attitude which corresponds to said preset position of said autosyn motor.

22. An aircraft attitude indicating system for indicating aircraft pitch deviations about any selectable aircraft pitch attitude comprising a pitch gyroscope mounted on said aircraft, an autosyn generator operatively coupled to said pitch gysoscope for producing an output which is dependent on the deviation of said aircraft from any given reference attitude at which said pitch gyroscope is set, an autosyn motor coupled to said autosyn generator for receiving the output thereof, said autosyn motor consisting of a stator and a rotor, an amplifying circuit coupled to said autosyn motor for amplifying the output of said autosyn generator which is received by said autosyn motor, an electric motor coupled to the output of said amplifying circuit, a mechanical linkage connecting said electric motor to said autosyn motor, whereby the electrical output of said autosyn generator to said autosyn motor is amplified and fed to said electric motor which in turn through the mechanical linkage to said autosyn motor changes the relative positions of the stator and rotor of said autosyn motor to a position which corresponds to the output of said autosyn generator, means in said amplifying circuit for stopping said electric motor in any position thereof and thereby causing said autosyn motor stator and rotor to maintain a fixed position relative to each other, a signalling circuit coupled to said autosyn motor, said signalling circuit containing first means for producing a first signal when said autosyn stator and rotor bear a relationship to each other which corresponds to the output of said autosyn generator, said signalling circuit also containing second and third means for producing second and third signals, respectively, when said autosyn stator and rotor bear a relationship to each other which does not correspond to the output of said autosyn generator but corresponds to an attitude which is below or above the actual attitude of the aircraft as represented by the output of said autosyn generator, any position in which said autosyn motor stator and rotor are positioned corresponding to the selectable aircraft pitch attitude about which aircraft pitch deviations are indicated.

23. An aircraft attitude indicating system as set forth in claim 22 wherein said means in said amplifying circuit for stopping said electric motor in any position thereof comprises a switch interposed between said autosyn motor and said electric motor, and wherein independent means are provided for adjusting the position of said electric motor, said means including second switch means provided for coupling said electric motor to a voltage source whereby said electric motor when energized can position said autosyn motor in any position to indicate aircraft pitch deviations about any desired attitude corresponding to said position.

24. An aircraft pitch attitude indicating system as set forth in claim 23 wherein said mechanical linkage includes a clutch, means connected to said clutch for selectively engaging and disengaging said clutch whereby said motor is selectively connected to and disconnected from said autosyn motor, and means connected to said autosyn motor for positioning said autosyn motor in a preset position when said clutch is disengaged whereby said indicating system will indicate deviations about an aircraft attitude which corresponds to said preset position of said autosyn motor.

25. An aircraft pitch attitude indicating system as set forth in claim 24 including indicating means coupled to said autosyn motor for indicating, in units of angular measurement, the aircraft attitude which corresponds to the position of said autosyn motor.

References Cited in the file of this patent

UNITED STATES PATENTS

| | | |
|---|---|---|
| 1,612,117 | Hewlett et al. | Dec. 23, 1926 |
| 2,405,231 | Newhouse | Aug. 6, 1946 |
| 2,478,221 | Alford et al. | Aug. 9, 1949 |
| 2,532,290 | Cochran, Jr. | Dec. 5, 1950 |
| 2,584,261 | Davis et al. | Feb. 5, 1952 |
| 2,603,696 | McEwan | July 15, 1952 |